United States Patent
Lim et al.

(10) Patent No.: US 8,627,478 B2
(45) Date of Patent: Jan. 7, 2014

(54) METHOD AND APPARATUS FOR INSPECTING NON-PORTABLE EXECUTABLE FILES

(71) Applicant: Ahnlab, Inc., Gyeonggi-do (KR)

(72) Inventors: Cha Sung Lim, Gyeonggi-do (KR); Ju Seok Lee, Gangwon-do (KR)

(73) Assignee: Ahnlab, Inc. (KR)

( * ) Notice: Subject to any disclaimer, the term of this patent is extended or adjusted under 35 U.S.C. 154(b) by 0 days.

(21) Appl. No.: 13/887,610

(22) Filed: May 6, 2013

(65) Prior Publication Data

US 2013/0305373 A1    Nov. 14, 2013

(30) Foreign Application Priority Data

May 11, 2012  (KR) .................. 10-2012-0050156

(51) Int. Cl.
  *H04L 9/00* (2006.01)
(52) U.S. Cl.
  USPC ............................................ 726/24; 717/127
(58) Field of Classification Search
  USPC ............................................ 726/24; 717/127
  See application file for complete search history.

(56) References Cited

U.S. PATENT DOCUMENTS

| 7,340,777 B1 * | 3/2008 | Szor ................................. 726/26 |
| 8,166,545 B2 | 4/2012 | Kim et al. |
| 2009/0126012 A1 * | 5/2009 | Treadwell et al. ............... 726/22 |
| 2009/0254992 A1 * | 10/2009 | Schultz et al. ................... 726/24 |

FOREIGN PATENT DOCUMENTS

| KR | 1020040098902 | 11/2004 |
| KR | 100850361 | 7/2008 |
| KR | 1020100005518 | 1/2010 |
| KR | 1020110046850 | 5/2011 |
| WO | WO2012091488 | * 5/2012 |

OTHER PUBLICATIONS

Wei Yan, "CAS: A framework of online detecting advance malware families for cloud-based Security", 2012, IEEE, pp. 220-225.*
Ding et al., "HeapTaichi: Exploiting Memory Allocation Granularity in Heap-Spraying Attacks", Dec. 2010, ACM, pp. 327-336.*

* cited by examiner

*Primary Examiner* — Matthew Smithers
(74) *Attorney, Agent, or Firm* — Bacon & Thomas, PLLC (57) ABSTRACT

An apparatus for inspecting a non-PE file includes a data loading unit configured to load candidate malicious address information related to a malicious code of the non-PE file; and a program link unit configured to acquire normal address range information of a module being loaded on a memory when an application program adapted for the non-PE file is executed and set up a candidate malicious address corresponding to the candidate malicious address information to be a breakpoint of the application program. Further, the apparatus includes a malicious code determination unit configured to determine whether a next execution address is within the normal address range information when there occurs an event derived from the breakpoint.

20 Claims, 4 Drawing Sheets

METHOD AND APPARATUS FOR INSPECTING NON-PORTABLE EXECUTABLE FILES

FIELD OF THE INVENTION

The present invention relates to an apparatus and method for inspecting non-PE (non-Portable Executable) files. More particularly, the present invention relates to an apparatus and method for inspecting whether non-PE files contain a malicious shell code by using candidate malicious address information related to the malicious code of the non-PE files, and a computer-readable storage medium including computer executable instructions to perform the method.

BACKGROUND OF THE INVENTION

As is well known, with the spread of the Internet and wireless communication devices, routes of infection of malicious codes are becoming more diverse and the extent of damage caused by the malicious codes increases every year. The term "malicious codes" used herein refers to as the software that has been intentionally produced to perform vicious behavior contrary to the intention and interests of a user, such as destroying the computer system and leaking information. There are various kinds of malicious codes such as virus, worms, Trojan, backdoor, logic bomb, trap doors, etc. used as a hacking tool, vicious spyware, vicious ad ware and the like. The malicious codes, through self-replication or automatic breeding, cause problems such as the leakage of personal information such as a password and an identifier (ID) of a user, system control, change/deletion of files, destruction of the system, denial of service of application/system, leakage of core data and installation of the other hacking programs, which results in extremely diverse and serious damages.

On the other hand, an APT (Advanced Persistent Threat), which is one of the issues in recent, persistently utilizes various types of malicious codes with high attacking techniques in order to steal information targeted by an attacker. Particularly, the APT attack is nearly not detected in an early invasion phase, and it typically uses non-PE files including the malicious codes. It is because that the programs for running the non-PE files, such as word-processors or imaging programs, essentially have some degree of security vulnerability and that variant malicious codes can be easily made with the change in the non-PE files if the malicious codes are included in the non-PE files.

Owing to the above properties, there are many cases where the APT attack uses a malicious non-PE file exploit to achieve the Zero-day attack. For example, if a recipient inadvertently opens the malicious non-PE file attached to email, the computer system of the recipient is then infected with a malicious file, such that the malicious file can attack other computer systems and invade the computer systems to steal key data. In addition, since the non-PE file has a variety of formats, needed are the substantial amount of time and effort that an expert examines whether the non-PE file is malicious and analyzes the vicious activities done by the non-PE file. Moreover, from the standpoint of almost all the conventional techniques, it is not easy to find a countermeasure against some variant malware deformed and newly created even for the analysis duration.

A study of a malware treating system (or vaccine program) has continued in order to detect and treat the malicious codes. Most malware treating systems (vaccine program), known so far, are made to detect a malicious code within an executable file.

As such, the reason why the malware treating system detects the malicious code from the executable file results from the fact that most malicious codes take a type of executable files in a particular system so that it can be run on the particular system. For example, file extensions of the malicious code that are required to be executed in the Windows system are exe, cpl, ocx, dll, vxd, sys, scr, drv, etc.

However, a malicious shell code, which attracts attention in recent, is inserted in different files having a format of a non-PE file so that it can bypass the malware treating system and the expert. By way of example, the file extensions of the non-PE file taken by the malicious code in the Windows system are HWP, DOG, XLS, JS, HTML, JPG, etc.

In order to inspect whether the non-PE file is malicious, the expert needs to determine whether every file has a malicious code. In particular, for a non-PE file employing the exploit, the substantial amount of time and effort are needed that an expert examines whether the non-PE file is malicious and analyzes the vicious activities. Moreover, in view of almost all the conventional techniques, it is nearly impossible to find a countermeasure against some variant malware deformed and newly created even for the analysis duration.

Therefore, as described above, there strongly needs the development of techniques to defense a situation employing the malicious non-executable exploit in order for achieving an APT attack scenario.

A malicious code inspecting method of a related art includes a signature-based malicious code inspecting method. However, the signature-based method cannot properly defense the Zero-day exploit for a large amount of signature databases is necessary to identify different types of attacks.

Another method for detecting the malicious code within the non-PE file includes a method to detect behaviors that are varied depending on how an attacker designs the shell code contained in the malicious non-PE file. However, this method requires obtaining information such as design methods for different attackers, which leads to a false positive and false negative.

SUMMARY OF THE INVENTION

In view of the above, the present invention provides an apparatus and method for inspecting non-PE files, which is capable of determining whether the non-PE files contains a malicious shell code by using candidate malicious address information related to the malicious code of the non-PE file.

Further, the present invention provides an apparatus and method for inspecting non-PE files, which is capable of detecting malicious non-PE files in bulk trying the same exploit by using a Relative Virtual Address (RVA) of a module which has a former example where an instruction execution address points out a malicious code area.

Further, the present invention provides an apparatus and method for inspecting non-PE files, which is capable of effectively defending an APT attack that uses the Zero-day exploit utilizing a malicious non-PE file.

The present invention will not be limited to the above, and another object, which has not been described, will be clearly understood to those skilled in the art from the following description.

In accordance with a first aspect of the present invention, there is provided an apparatus for inspecting a non-PE file. The apparatus includes a data loading unit configured to load candidate malicious address information related to a malicious code of the non-PE file; a program link unit configured to acquire normal address range information of a module being loaded on a memory when an application program adapted for the non-PE file is executed and set up a candidate malicious address corresponding to the candidate malicious address information to be a breakpoint of the application program; and a malicious code determination unit configured to determine whether a next execution address is within the normal address range information when there occurs an event derived from the breakpoint.

Further, when it is determined that the execution address is not within the normal address range information, the malicious code determination unit may be configured to determine that the non-PE file is malicious.

Further, when it is determined that the execution address is not within the normal address range information, the malicious code determination unit may be configured to check whether a memory area pointed out by the execution address has an execution attribute and may determine whether the non-PE file is malicious depending the check result.

Further, when the memory area pointed out by the execution address has not the execution attribute, the malicious code determination unit may be configured to check whether there occurs an abnormal event due to the execution of a code stored in the memory area pointed out by the execution address and may determine whether the non-PE file is malicious depending on the check result.

Further, when the memory area pointed out by the execution address has the execution attribute, the malicious code determination unit may be configured to determine that the PE-file is normal.

Further, the apparatus may further comprise a database unit that stores a set of the candidate malicious address information, wherein the candidate malicious address information may include information on a relative virtual address (RVA) of a module having a former case where an instruction execution address has pointed out a malicious shell code area.

Further, the apparatus may further comprise a malicious code extraction unit configured to extract the malicious code of the non-PE file that has been determined as the malicious file in a format of an execution file or an executable file.

The apparatus may further comprise a cause analysis unit configured to analyze the occurrence reason of an exploit by comparing the RVA with vulnerability information.

Further, the normal address range information may comprise a start address and an end address of a module loaded with the execution of the application program.

Further, the execution address may be obtained from an EIP (Extended Instruction Pointer) register of a central processing unit.

Further, the malicious code determination unit may be configured to store an execution address of an instruction executed immediately before the execution address beyond the normal address range information.

In accordance with a second aspect of the present invention, there is provided a method for inspecting a non-PE file. The method includes loading candidate malicious address information related to a malicious code of the non-PE file; acquiring normal address range information of a module being loaded on a memory when an application program adapted for the non-PE file is executed; setting up a candidate malicious address corresponding to the candidate malicious address information to be a breakpoint of the application program; and determining whether a next execution address is within the normal address range information when there occurs an event derived from the breakpoint.

Further, said determining whether a next execution address is within the normal address range information may comprise when it is determined that the next execution address is not within the normal address range information, determining that the non-PE file is malicious.

Further, said determining whether a next execution address is within the normal address range information may comprise: when it is determined that the execution address is not within the normal address range information, determining whether a memory area pointed out by the execution address has an execution attribute; and determining whether the non-PE file is malicious depending on whether the memory area pointed out by the execution address has an execution attribute.

Further, said determining whether a memory area pointed out by the execution address has an execution attribute may comprise: when the memory area pointed out by the execution address has not the execution attribute, checking whether there occurs an abnormal event due to the execution of a code stored in the memory area pointed out by the execution address; and when there occurs an abnormal event, determining that the non-PE file is malicious.

Further, the method may further comprise storing a set of the candidate malicious address information, wherein the candidate malicious address information includes information on a relative virtual address (RVA) of a module having a former case where an instruction execution address has pointed out a malicious shell code area.

Further, the method may further comprise extracting the malicious code of the non-PE file that has been determined as the malicious file in a form of an execution file or an executable file.

Further, the normal address range information may comprise a start address and an end address of a module loaded with the execution of the application program.

Further, the execution address may be obtained from an EIP (Extended Instruction Pointer) register of a central processing unit.

Further, said determining whether a next execution address is within the normal address range information may comprise determining whether the execution address is within the normal address range information depending on a kind of the instruction of the application program under execution.

In accordance with the exemplary embodiment of the present invention, it is possible to detect a number of malicious non-PE files in bulk trying the same exploit using a particular RVA to do a malicious act by storing a set of relative virtual addresses (RVAs) of a module having a former case where an execution address of an instruction being loaded with the execution of a program adapted for the non-PE file has pointed out a malicious code area, loading an RVA corresponding to a format of the non-PE file, setting up a breakpoint to the RVA, and determining whether the non-PE file is malicious when there occurs a breakpoint even.

Further, it is possible quickly to detect all sorts of variant malicious non-PE files since the detection is achieve only through the determination on whether to move from a particular RVA to a malicious shell code by setting up a breakpoint to an RVA of a module having a former case where an instruction execution address have pointed out a malicious code area and checking whether a next execution file points out a malicious shell code out of a normal address range to inspect whether the non-PE file is a malicious file containing the malicious shell code.

In addition, it is possible to effectively defending an APT attack using the Zero-day exploit utilizing a malicious non-PE file.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of embodiments and methods of accomplishing the present invention will be clearly understood from the following described description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

The term "a non-PE file" used herein refers to as a file, having a concept opposite to an execution file or an executable file, which cannot be run by itself. For example, the non-PE file may include, but not limited to, a document file such as a Hanword file, MS-word file, an image file including as a JPEG file, a moving image file, a JavaScript file, an HTML file and the like.

A malicious non-PE file containing a malicious code may be used in an APT (Advanced Persistent Threat) attack and the like via a way of being attached to an e-mail or of transferring the malicious non-PE file itself through a network. In these cases, the malicious code may be a shell code, which may be executed when a program having the type (or format) of the non-PE file is executed. The non-PE file, for example, may include, files having a file extension such as hwp, doc, pdf, jpg, js, html and the like.

In particular, the apparatus and method for inspecting a non-PE file obtains in advance an RVA (Relative Virtual Address) of a module having a former case where an instruction execution address has pointed out a malicious shell code area and stores the obtained RVA in a data base unit so that it can be utilized in the inspection of the non-PE file, which results in achieving a speedy and effective detection of a malicious non-PE file.

In relation to the above, it will be explained on a process of obtaining the RAV as follows.

A malicious non-PE file may include a malicious shell code, and the malicious non-PE file including the malicious codes move to a malicious code area by any means when an instruction is executed. The movement to the malicious code area may be predicted through the identification of the execution address of the instruction. For example, an execution address of an instruction to be executed in a next sequence can be obtained by identifying a value stored in an EIP (Extended Instruction Pointer) register, which is one of a plurality of registers of a central processing unit (CPU). Therefore, it can be classified or determined that the malicious file having the instruction moving to the malicious shell code area beyond a normal address range is malicious. Further, by using this information, it is possible to obtain in advance a virtual address of a module having a former case that a command execution address has pointed out the malicious shell code area. In this regard, since the value of the virtual address may vary with the change in a running environment such as the change in hardware, it is necessary to convert the virtual address into a relative virtual address (RVA) and thus the RVA will be used in inspecting whether the non-PE file is malicious in an exemplary embodiment of the present invention.

Hereinafter, the exemplary embodiments of the present invention will be described in detail with reference to the accompanying drawings.

Figure 1:
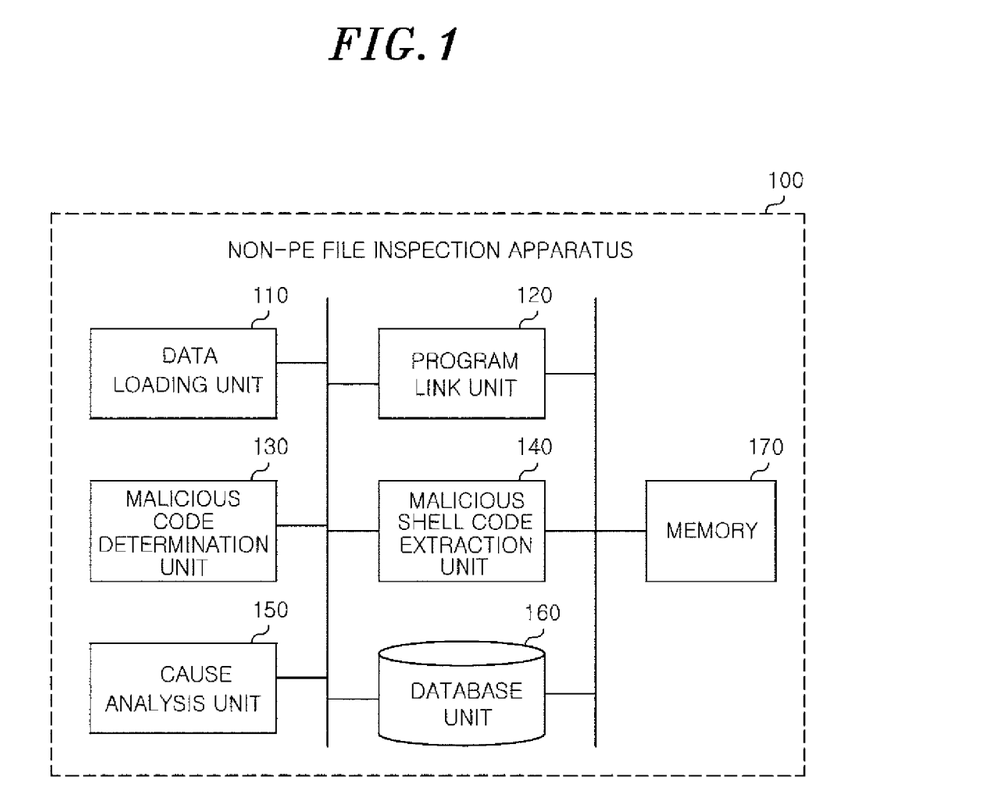
FIG. 1 is a block diagram of an apparatus for inspecting non-PE files in accordance with an exemplary embodiment of the present invention.

FIG. 1 is a block diagram of an apparatus for inspecting non-PE files in accordance with an exemplary embodiment of the present invention.

As illustrated in FIG. 1, the apparatus 100 for inspecting non-PE files may include a data loading unit 110, a program link unit 120, a malicious code determination unit 130, a malicious shell code extraction unit 140, a cause analysis unit 150, a database unit 160 and a memory 170.

The database unit 160 stores a set of RVAs of modules having a former example where an instruction execution address has pointed out a malicious shell code area, wherein the RVA information will be used as a candidate malicious address. In other words, the term "a set of RVAs" used herein refers to as a set of RVAs of modules having a former example that have tried to move a malicious cell code area. In this case, the modules may be dynamic linking libraries (DLL).

Also, the database unit the database unit 160 stores vulnerability information mapped with the respective RVAs. The vulnerability information may be used to perceive the occurrence reason of the exploit having a particular RVA by comparing to the RVAs. In accordance with an exemplary embodiment of the present invention, the database unit 160 may store a set of plural candidate malicious address information that are different by file formats of the non-PE files.

The data loading unit 110 loads the candidate malicious address information based on the RVAs from the database unit 160 when an inspection is made on whether the non-PE file is malicious. In accordance with an exemplary embodiment, the data loading unit 110 checks the file format of the non-PE file and then loads the candidate malicious address information that meets the file format of the non-PE file from among the plurality of sets of the candidate malicious address information in order for setting a breakpoint.

When an application program adapted for the non-PE file to be inspected is executed, the program link unit 120 acquires normal address range information specified by a start address and an end address and sets up a candidate malicious address corresponding to the candidate malicious address information in accordance with the candidate malicious address information loaded by the data loading unit 110 to be a breakpoint of an application program. In accordance with an exemplary embodiment, the program link unit 120 may directly execute the application program or may request a separate program executor (not shown) to execute the application program.

The malicious code determination unit 130 determines whether a next execution address is within the normal address range information when there occurs an event derived from the breakpoint that is set up by the program link unit 120. When it is determined that the next execution address falls within the normal address range information, the malicious code determination unit 130 determines that the non-PE file is normal. Otherwise, when the next execution address is out of the normal address range information, the malicious code determination unit 130 determines that the non-PE file is malicious. In this regard, the malicious code determination unit 130 may utilize a next execution address stored in an EIP (Extended Instruction Pointer) register in a central processing unit (CPU). In accordance with an exemplary embodiment, the malicious code determination unit 130 determines whether a next execution address is within the normal address range information in one step ahead depending on a kind of instruction, or immediately determines whether a next execution address is within the normal address range information without one step ahead. For example, in a case where the instruction is a SEH (Structured Exception Handling), the malicious code determination unit 130 may perform a comparison between a chain value of the SEH and the normal address range information. Further, for the instruction such as return, call or jump, it may be determined whether a next execution address is within the normal address range information in one step ahead. Herein, the chain value of the SEH represents an address to be executed.

However, the malicious code determination unit 130 may exceptionally handle a situation that a normal program executes an instruction out of the normal address range information in order to load the non-PE file.

In the explanation of an exception handling, if the execution address is out of the normal address range information, the malicious code determination unit 130 checks the attribute of an area of the memory 170 pointed out by the execution address. As a result of the check, when the attribute of the area of the memory 170 is not an execution attribute, the malicious code determination unit 130 determines whether the event caused by the execution of the code stored in the area of the memory 170 pointed by the execution address is an abnormal event.

In this regard, the abnormal event may include, but is not limited to, as follows:

Access Violation;
EXCEPTION_ARRAY_BOUNDS_EXCEEDED;
EXCEPTION_DATATYPE_MISALIGNMENT;
EXCEPTION_FLT_DENORMAL_OPERAND;
EXCEPTION_FLT_DIVIDE_BY_ZERO;
EXCEPTION_FLT_INEXACT_RESULT;
EXCEPTION_FLT_INVALID_OPERATION;
EXCEPTION_FLT_OVERFLOW;
EXCEPTION_FLT_STACK_CHECK;
EXCEPTION_FLT_UNDERFLOW;
EXCEPTION_GUARD_PAGE;
EXCEPTION_ILLEGAL_INSTRUCTION;
EXCEPTION_IN_PAGE_ERROR;
EXCEPTION_INT_DIVIDE_BY_ZERO;
EXCEPTION_INT_OVERFLOW;
EXCEPTION_INVALID_DISPOSITION;
EXCEPTION_INVALID_HANDLE;
EXCEPTION_NONCONTINUABLE_EXCEPTION;
EXCEPTION_PRIV_INSTRUCTION; and
EXCEPTION_STACK_OVERFLOW When there occurs the abnormal event, the malicious code determination unit 130 determines that the non-PE file contains a malicious code and stores in a virtual memory the execution address of the instruction that has been executed immediately before executing the instruction of the execution address out of the normal address range information.

Otherwise, when there occurs not the abnormal event, the malicious code determination unit 130 compares the execution address of the instruction up to predetermined steps, e.g., subsequent three to five steps with the normal address range information to determine whether the non-PE file is malicious. That is, the malicious code determination unit 130 determines that the non-PE file is malicious when the execution address of the instruction up to the predetermined step is out of the normal address range information and determines that the non-PE file is normal when the execution address of the instruction prior to the predetermined step is within the normal address range information so that an instruction can be executed from a subsequent step.

The malicious code extraction unit 140 extracts the malicious shell code that the application program for the non-PE file has decoded in a virtual memory in an execution file format or executable file format. For example, the malicious shell code extraction unit 140 may extract the decoded malicious shell code in a file format having any one of the file extensions such as exe, cpl, ocx, dll, vxd, sys, scr, dry and the like. However, the file extensions of the file format that can be extracted are not limited thereto.

Further, the malicious shell code extraction unit 140 may request the analysis of the code extracted in the execution file format or executable file format to a server, that is connected to a communication network (not shown), for inspecting and analyzing malicious codes.

The cause analysis unit 150 analyzes the occurrence reason of the exploit by comparing the RVA of the non-PE file determined as the malicious file by the malicious code determination unit 130 with the vulnerability information stored in the database unit 160 and reports the analyzed occurrence reason of the exploit.

Although the exemplary embodiment of the present invention 130 has been described that the cause analysis unit 150 is disposed in the non-PE file inspecting apparatus, it is noted that the cause analysis unit may be disposed in a separate server for inspecting a non-PE file, which is connected via the communication network.

When a user selects a directory having a plurality of the non-PE files, the apparatus for inspecting a non-PE file in accordance with an exemplary embodiment of the present invention may perform the inspection of the respective non-PE files stored in a directory.

In addition, the apparatus for inspecting a non-PE file in accordance with another exemplary embodiment of the present invention may monitor in real time whether the non-PE file forwarded through a communication network is malicious.

Figure 2:
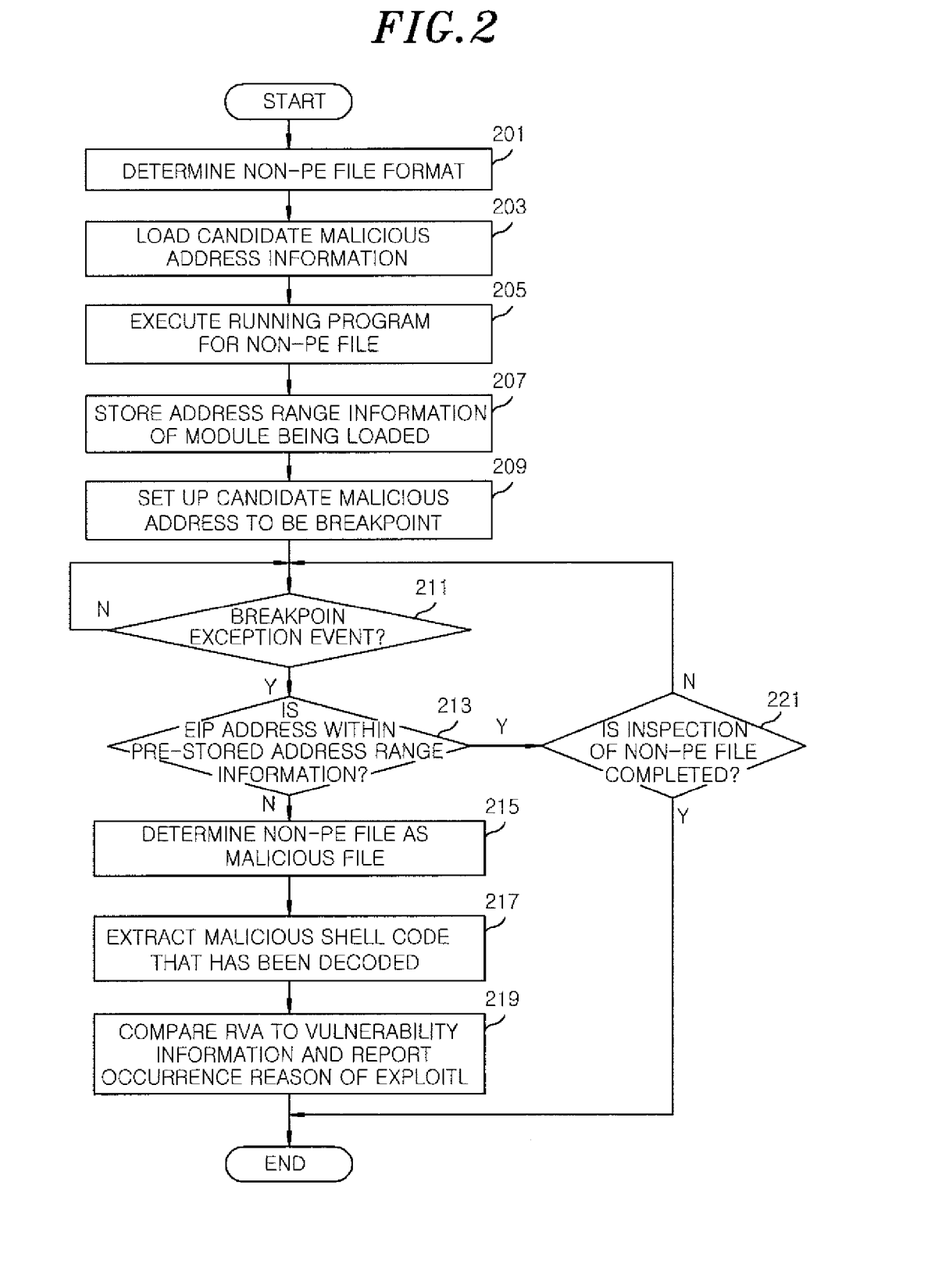
FIG. 2 is a flow chart illustrating a method for inspecting non-PE files in accordance with an exemplary embodiment of the present invention.

FIG. 2 is a flow diagram illustrating a method for inspecting the non-PE file in accordance with an exemplary embodiment of the present invention.

As illustrated in FIG. 2, the method for inspecting the non-PE files, wherein the method obtains in advance an RVA of a module having a former case where an instruction execution address has pointed out a malicious shell code area, includes acquiring normal address range information of a module loaded with the execution of an application program adapted for a non-PE file to be inspected, in operations S201 to S207; setting up a breakpoint of the application program to candidate malicious address information based on the RVA, in operation S209; checking whether a next execution address is within the normal address range information when there occurs an event derived from the breakpoint, in operations S211 and S213; determining that the non-PE file is malicious when it is checked that the next execution address is out of the normal address range information, in operation S215; extracting the malicious shell code that has been decoded in a virtual memory by the application program in an execution file format or an executable file format, in operation S217; analyzing the occurrence reason of the exploit by comparing the RVA with the vulnerability information to report the occurrence reason, in operation S219; when it is checked, in the operation S213, that the next execution address is within the normal address range information, monitoring the occurrence of the breakpoint event in operation S211 until the inspection of the remaining non-PE files is completed, in operation S221.

Hereinafter, before explaining a non-PE file inspection method performed by the apparatus for inspecting the non-PE file, in order to help understand the exemplary embodiment of the present invention, a description will be made on a process of obtaining the set of RVAs stored in the database unit 160 of the non-PE file inspection apparatus 100 (i.e., the RVAs of modules having a former example where an instruction execution address has tried to point out a malicious shell code area). Hereinafter, a process of obtaining the RVAs will be illustrated by way of an example where it is performed at first hand by the non-PE file inspection apparatus.

First, when a directory having one or more non-PE files stored therein is selected through the use of a user interface by a user, the data loading unit 110 determines a format of a non-PE file in the directory selected by the user and provides the non-PE file to the program link unit 120.

The program link unit 120 directly executes the application program adapted for the non-PE file or requests a separate system (not shown) to execute the application program. The information on the execution addresses for each instruction of a module loaded during the execution of the application program is then provided to the malicious code determination unit 130. Herein, the execution address information may be the address on the virtual memory when the instructions within the module are executed or may be the address information that is stored in the EIP register.

Further, the program link unit 120 stores the normal address range including the start address and the end address that are loaded in the virtual memory with the execution of the application program.

Thereafter, the malicious code determination unit 130 compares the execution address information, provided from the program link unit 120, with the normal address range information to determine whether the execution address information is within the normal address range.

In this case, when the execution address information is within the normal address range, the malicious code determination unit 130 receives execution address information for a next instruction from the program link unit 120 and determines whether the execution address of the next instruction is within the normal address range.

What the execution address is out of the normal address range represents that the EIP, which is one of values of CPU registers moves to the malicious shell code area and, therefore, the malicious code determination unit 130 classifies the non-PE file as a malicious file to suspend the execution of the application program under execution.

Subsequently, the malicious code determination unit 130 temporally stores information on the execution address before moving to the malicious shell code area and information on the corresponding module (i.e., the module having vulnerability) in the application program and provides the information to the cause analysis unit 150.

Meanwhile, the malicious shell code extraction unit 140 extracts the code stored in the area of the memory 170, which is pointed out by the execution address out of the normal address range, i.e., the malicious shell code area, in an execution file format or an executable file format. The extracted code is then stored in the virtual memory.

The cause analysis unit 150 compares the information on the execution address and module, provided from the malicious code determination unit 130, with the pre-stored vulnerability information to catch the occurrence reason for the vulnerability. The caught occurrence reason is then handed to the user or an analyzer so that the analysis result about the corresponding non-PE file can be reported.

After that, if another non-PE file remains in the directory, the non-PE file inspection apparatus 100 repetitively performs the inspection process with respect to the remaining non-PE files.

As known from the explanation on the inspection process for the non-PE files performed by the non-PE file inspection apparatus hitherto, the non-PE files commonly contain a malicious code, e.g., a malicious shell code, and a malicious non-PE file containing the malicious shell code move eventually to a malicious shell code area in any way when the instruction for the malicious shell code is executed.

The movement of the malicious non-PE file to the malicious shell code area may be predicted beforehand by examining a next execution address. For example, the next execution address may be ascertained from a value stored in an EIP register, which is one of registers in a central processing unit (CPU). Therefore, the non-PE file having the instruction that moves it to the malicious shell code area out of the normal address range can be regarded and classified as the malicious file. Further, such information enables the user to obtain in advance the virtual addresses of the modules having a former example where the instruction execution address points out the malicious shell code area. In this regard, since the virtual addresses onto which modules are loaded vary each time the loading of the modules with the change in a program execution environment, the virtual addresses need to be substituted with RVAs. The non-PE file inspection apparatus 100 of the exemplary embodiment stores the RVAs in advance in the database unit 160 in order to inspect whether the non-PE file is malicious.

Figure 3:
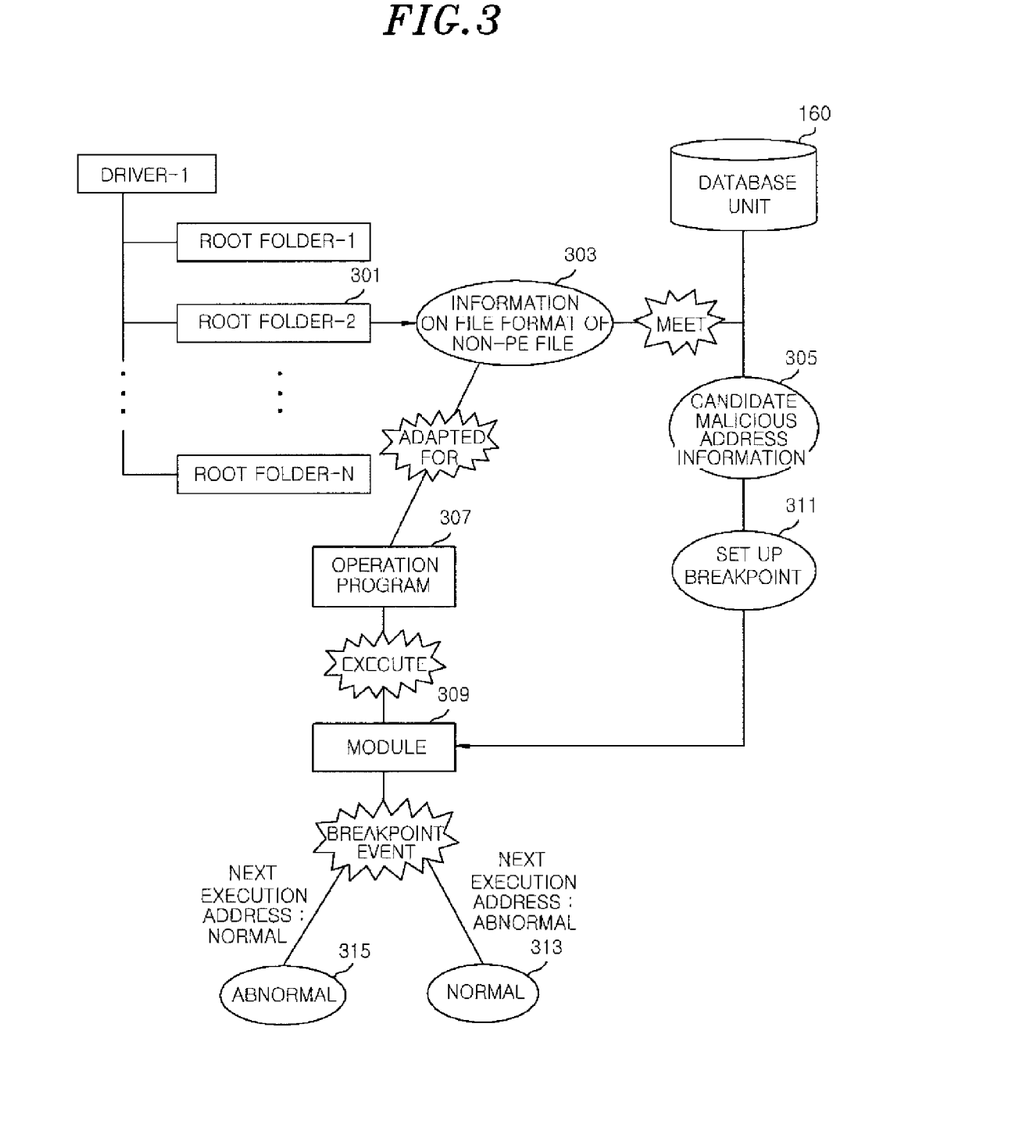
FIG. 3 illustrates a conceptual diagram to help understand the method of inspecting non-PE files in accordance with an exemplary embodiment of the present invention.

Hereinafter, the process of inspecting the non-PE files performed by the non-PE file inspection apparatus will be explained in detail with reference to FIGS. 1 and 3. Herein, the program link unit 120 in accordance with an exemplary embodiment of the present invention may directly execute a particular application program to be executed. This indicates that the non-PE file inspection apparatus 100 of the exemplary embodiment may store the particular application program or all sorts of programs including the particular application program in a memory device such as a program storage unit.

First, a case where the non-PE file inspection apparatus 100 directly executes the particular application program will be described in accordance with an exemplary embodiment of the present invention.

In operation S201, when a directory having one or more non-PE files to be inspected is selected through the use of a user interface, the data loading unit 110 checks a format of a non-PE file on a basis of file format information 303 for the non-PE file stored in the directory. For example, as illustrated in FIG. 3, when a root folder-2 301 is selected from among a root folder-1 to a root folder-N located under a drive-1 via the user interface, the data loading unit 110 determines the format of a non-PE file by checking a file format of the non-PE file stored in the root folder-2 301.

In operation S203, the data loading unit 110 loads candidate malicious address information 305 that meets the file format of the non-PE file from among the set of the plurality of candidate malicious address information stored in the database unit 160.

The program link unit 120 executes an application program 307 adapted for executing the non-PE file that is to be subjected to the malicious inspection, in operation S205, and the program link unit 120 acquires the normal address range information of the module loaded with the execution of the application program and stores the acquired normal address range information in operation S207. In this case, the module, for example, may be a dynamic link library (DLL). By way of example, the program link unit 120 may load a corresponding application program from among the application programs stored in a memory device such as a program storage unit (not shown) and executes the same in a virtual environment.

Also, in operation S209, the program link unit 120 sets up a candidate malicious address corresponding to the candidate malicious address information 305 to be a breakpoint 311 of the application program in accordance with the candidate malicious address information 305 loaded by the data loading unit 110.

Thereafter, when it is checked, in operation S211 that a breakpoint exception event occurs due to the breakpoint set up in the operation S209, it is determined, in operation S213, whether a next execution address is within the normal address range information acquired in the operation S207. When it is determined that the next execution address is out of the normal address range information, it is classified and determined that the non-PE file is a malicious file 313 in operation S215. Herein, the malicious code determination unit 130 may determine whether a corresponding instruction moves the non-PE file to the malicious shell code area beyond the normal address range information through the use of a next execution address stored in an EIP register in a CPU.

Meanwhile, in the operation S213, the malicious code determination unit 130 may determine whether a next execution address is within the normal address range information in one step ahead or immediately determine whether a next execution address is within the normal address range information without one step ahead. For example, for the instruction such as RETURN, CALL or JUMP, the malicious code determination unit 130 may determine whether the next execution address is within the normal address range information in one step ahead. However, for the instruction such as a SEH, the malicious code determination unit 130 may determine whether a chain value of the SEH is within the normal address range.

Subsequently, in operation S217, the malicious shell code extraction unit 140 extracts the malicious shell code that the application program adapted for the non-PE file has been decoded in the virtual memory in an execution file or executable file. For example, the malicious shell code extraction unit 140 may extract the decoded malicious shell code in an execution file or executable file. In this case, the execution file or executable file may be extracted in any one format of the file extensions such as exe, cpl, ocx, dll, vxd, sys, scr, and dry. However, these file extensions of the file formats that can be extracted are not limited to the above. The execution file of the extracted malicious code execution file will be used to analyze the execution scheme of the malicious shell code.

In operation S219, the cause analysis unit 150 analyzes the occurrence reason of the exploit by comparing the RVA of the non-PE file classified as the malicious file by the malicious code determination unit 130 with the vulnerability information stored previously in the database unit 160 and reports the analyzed exploit occurrence reason. The vulnerability information may be, but not limited to, the information provided from CVE (Common Vulnerabilities and Exposures), Microsoft Security Bulletin (for example, MS11-002), NVD (National Vulnerability Database), US-CERT Bulletin, and so on.

When it is determined, in the operation S213, that the next execution address is within the normal address range information, the non-PE file is classified as a normal file 315, and the breakpoint exception event in the operation S211 is continued to be monitored until the inspection of the non-PE file is completed in operation S221. When the inspection of the non-PE file is completed, a subsequent inspection for another non-PE file within the same directory will be repetitively performed.

Further, as described above, in accordance with another exemplary embodiment of the present invention, the non-PE file inspection apparatus 100 may request a separate system (not shown) to perform the process of inspecting the non-PE file without directly executing the particular application program. In this case, the example of the system may be a user terminal in which the malicious code inspection method is installed or a program provider server which is connected via a communication network, but it is not limited thereto.

Meanwhile, although the embodiment as set forth above has exemplarily explained that the non-PE file that the execution address is out of the normal address range is determined as the malicious file, it may exceptionally handle a case where the area of the memory 170, which is pointed out by an execution address has an execution attribute. The related explanation will be given as follows.

Figure 4:
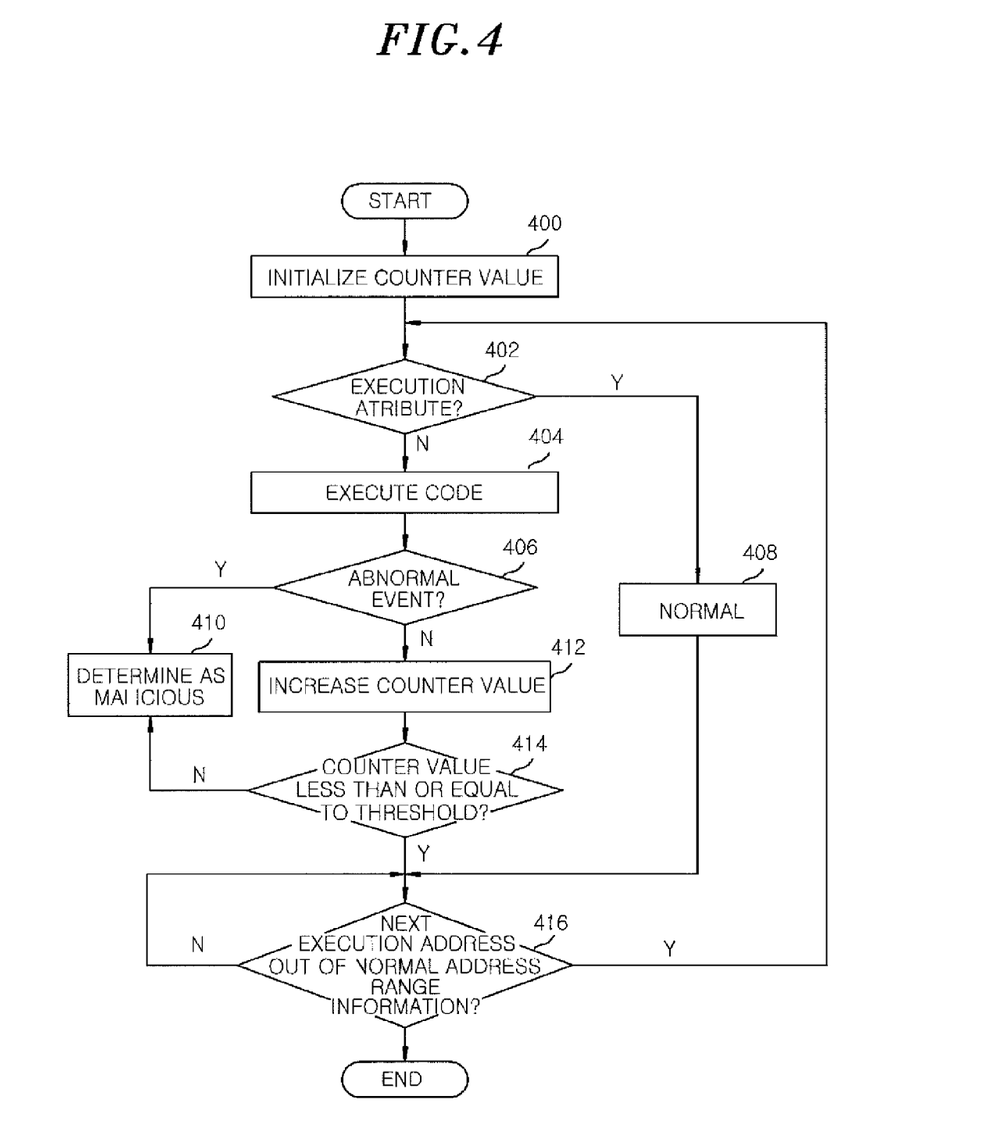
FIG. 4 is a flowchart illustrating a process performed by the non-PE file inspection apparatus in a case where an execution address points out an area beyond normal address range information in accordance with another exemplary embodiment of the present invention.

FIG. 4 is a flowchart illustrating a process performed by the non-PE file inspection apparatus in a case where an execution address points out an area beyond the normal address range information.

As illustrated in FIG. 4, when a first execution address points out an area of the memory 170 beyond the normal address range information, the malicious code determination unit 130 sets a value of a counter to a predetermined initial value, e.g., '0' in operation S400, and inspects the attribute of the area of the memory 170, which is pointed out by the first execution address to check whether the attribute is an execution attribute in operation S402.

As a result of the operation S402, when it is checked that the attribute is not an execution attribute, a code in the area of the memory 170, which is pointed out by the first execution address is executed in operation S404 and it is checked whether an event occurred owing to the execution of the code is an abnormal event in operation S406.

Meanwhile, when it is checked, in the operation S402, that the attribute is an execution attribute, the malicious code determination unit 130 determines that the non-PE file is normal in operation S408, and thereafter, the process advances to operation S416 where a next execution address, i.e., a second execution address is compared with the normal address range information. Further, as a result of the operation S406, the malicious code determination unit 130 also determines that the non-PE file is malicious when the event is an abnormal event in operation S410.

As a result of the operation S406, when it is checked that the abnormal event is not occurring, the malicious code determination unit 130 increases the value of the counter by '1' in operation S412. Thereafter, the process goes to the operation S414 where it is checked whether the value of the counter is lower than or equal to a threshold.

As a result of the operation S414, when the value of the counter is lower than or equal to a threshold, the malicious code determination unit 130 determines whether a next execution address provided from the program link unit 120, i.e., a second execution address to be executed at a next sequence is out of the normal address range information in operation S416.

As a result of the operation S416, when the second execution address is out of the normal address range information, the process returns to the operation S402 where the malicious code determination unit 130 continues to perform the above described operations.

Meanwhile, as a result of the operation S414, when the value of the counter exceeds the threshold, the malicious code determination unit 130 determines that the non-PE file is malicious.

Further, as a result of the operation S416, when the second execution address for the next sequence instruction points out the normal address range information, the malicious code determination unit 130 compares a third execution address of a next instruction with the normal address range information.

In accordance with the exemplary embodiment of the present invention, it is possible to detect a number of malicious non-PE files in bulk trying the same exploit using a particular RVA to do a malicious act by storing a set of relative virtual addresses (RVAs) of a module having a former case where an execution address of an instruction being loaded with the execution of a program adapted for the non-PE file has pointed out a malicious code area, loading an RVA corresponding to a format of the non-PE file, setting up a breakpoint to the RVA, and determining whether the non-PE file is malicious when there occurs a breakpoint even.

Further, it is possible quickly to detect all sorts of variant malicious non-PE files since the detection is achieve only through the determination on whether to move from a particular RVA to a malicious shell code by setting up a breakpoint to an RVA of a module having a former case where an instruction execution address have pointed out a malicious code area and checking whether a next execution file points out a malicious shell code out of a normal address range to inspect whether the non-PE file is a malicious file containing the malicious shell code.

In addition, it is possible to effectively defending an APT attack using the Zero-day exploit utilizing a malicious non-PE file.

The combinations of the each block of the block diagram and each step of the flow chart may be performed by computer program instructions. Because the computer program instructions may be loaded on a general purpose computer, a special purpose computer, or other processor of programmable data processing equipment, the instructions performed through the computer or other processor of programmable data processing equipment may generate the means performing functions described in the each block of the block diagram and each step of the flow chart. Because the computer program instructions may be stored in the computer available memory or computer readable memory which is capable of intending to a computer or other programmable data processing equipment in order to embody a function in a specific way, the instructions stored in the computer available memory or computer readable may produce a manufactured item involving the instruction means performing functions described in the each block of the block diagram and each step of the flow chart. Because the computer program instructions may be loaded on the computer or other programmable data processing equipment, the instructions performing the computer or programmable data processing equipment may provide the steps to execute the functions described in the each block of the block diagram and each step of the flow chart by a series of operational steps being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of essential characteristics of the embodiments of the present invention. Therefore, the exemplary embodiments disclosed herein are not used to limit the technical idea of the present invention, but to explain the present invention, and the scope of the technical idea of the present invention are not limited to these embodiments. Therefore, the scope of protection of the present invention should be construed as defined in the following claims and changes, modifications and equivalents that fall within the technical idea of the present invention are intended to be embraced by the scope of the claims of the present invention.

What is claimed is:

1. An apparatus for inspecting a non-PE file, the apparatus comprising:
    a data loading unit configured to load candidate malicious address information related to a malicious code of the non-PE file;
    a program link unit configured to acquire normal address range information of a module being loaded on a memory when an application program adapted for the non-PE file is executed and set up a candidate malicious address corresponding to the candidate malicious address information to be a breakpoint of the application program; and
    a malicious code determination unit configured to determine whether a next execution address is within the normal address range information when there occurs an event derived from the breakpoint.

2. The apparatus of claim 1, wherein when it is determined that the execution address is not within the normal address range information, the malicious code determination unit is configured to determine that the non-PE file is malicious.

3. The apparatus of claim 1, wherein when it is determined that the execution address is not within the normal address range information, the malicious code determination unit is configured to check whether a memory area pointed out by the execution address has an execution attribute and determine whether the non-PE file is malicious depending the check result.

4. The apparatus of claim 3, wherein when the memory area pointed out by the execution address has not the execution attribute, the malicious code determination unit is configured to check whether there occurs an abnormal event due to the execution of a code stored in the memory area pointed out by the execution address and determine whether the non-PE file is malicious depending on the check result.

5. The apparatus of claim 3, wherein when the memory area pointed out by the execution address has the execution attribute, the malicious code determination unit is configured to determine that the PE-file is normal.

6. The apparatus of claim 1, further comprising a database unit that stores a set of the candidate malicious address information,
wherein the candidate malicious address information includes information on a relative virtual address (RVA) of a module having a former case where an instruction execution address has pointed out a malicious shell code area.

7. The apparatus of claim 2, further comprising a malicious code extraction unit configured to extract the malicious code of the non-PE file that has been determined as the malicious file in a format of an execution file or an executable file.

8. The apparatus of claim 6, further comprising a cause analysis unit configured to analyze the occurrence reason of an exploit by comparing the RVA with vulnerability information.

9. The apparatus of claim 1, wherein the normal address range information comprises a start address and an end address of a module loaded with the execution of the application program.

10. The apparatus of claim 1, wherein the execution address is obtained from an EIP (Extended Instruction Pointer) register of a central processing unit.

11. The apparatus of claim 1, wherein the malicious code determination unit is configured to store an execution address of an instruction executed immediately before the execution address beyond the normal address range information.

12. A method for inspecting a non-PE file, the method comprising:
loading candidate malicious address information related to a malicious code of the non-PE file;
acquiring normal address range information of a module being loaded on a memory when an application program adapted for the non-PE file is executed;
setting up a candidate malicious address corresponding to the candidate malicious address information to be a breakpoint of the application program; and
determining whether a next execution address is within the normal address range information when there occurs an event derived from the breakpoint.

13. The method of claim 12, wherein said determining whether a next execution address is within the normal address range information comprises:
when it is determined that the next execution address is not within the normal address range information, determining that the non-PE file is malicious.

14. The method of claim 12, wherein said determining whether a next execution address is within the normal address range information comprises:
when it is determined that the execution address is not within the normal address range information, determining whether a memory area pointed out by the execution address has an execution attribute; and
determining whether the non-PE file is malicious depending on whether the memory area pointed out by the execution address has an execution attribute.

15. The method of claim 14, wherein said determining whether a memory area pointed out by the execution address has an execution attribute comprises:
when the memory area pointed out by the execution address has not the execution attribute, checking whether there occurs an abnormal event due to the execution of a code stored in the memory area pointed out by the execution address; and
when there occurs an abnormal event, determining that the non-PE file is malicious.

16. The method of claim 12, further comprising:
storing a set of the candidate malicious address information,
wherein the candidate malicious address information includes information on a relative virtual address (RVA) of a module having a former case where an instruction execution address has pointed out a malicious shell code area.

17. The method of claim 13, further comprising extracting the malicious code of the non-PE file that has been determined as the malicious file in a form of an execution file or an executable file.

18. The method of claim 12, wherein the normal address range information comprises a start address and an end address of a module loaded with the execution of the application program.

19. The method of claim 12, wherein the execution address is obtained from an EIP (Extended Instruction Pointer) register of a central processing unit.

20. The method of claim 12, wherein said determining whether a next execution address is within the normal address range information comprises:
determining whether the execution address is within the normal address range information depending on a kind of the instruction of the application program under execution.

* * * * *